United States Patent [19]

Nomura et al.

[11] Patent Number: 5,386,740
[45] Date of Patent: Feb. 7, 1995

[54] ROTARY FEED MECHANISM

[75] Inventors: Hiroshi Nomura; Norio Sato, both of Tokyo, Japan

[73] Assignee: Asahi Kogaku Kogyo Kabushiki Kaisha, Tokyo, Japan

[21] Appl. No.: 953,025

[22] Filed: Sep. 29, 1992

[30] Foreign Application Priority Data

| Sep. 30, 1991 [JP] | Japan | 3-320859 |
|---|---|---|
| Sep. 30, 1991 [JP] | Japan | 3-320860 |
| Sep. 30, 1991 [JP] | Japan | 3-320861 |
| Sep. 30, 1991 [JP] | Japan | 3-320862 |

[51] Int. Cl.⁶ .......................... F16H 27/02; G02B 7/02
[52] U.S. Cl. .................. 74/89.16; 359/704; 359/823
[58] Field of Search .............. 74/89.15, 89.16, 89.17, 74/89.18; 354/403; 359/699, 700, 701, 702, 704, 823

[56] References Cited

U.S. PATENT DOCUMENTS

| 3,370,907 | 2/1968 | Cox et al. | 359/704 X |
|---|---|---|---|
| 4,304,463 | 12/1981 | Tomori | 359/823 |
| 4,324,457 | 4/1982 | Tomori . | |
| 4,387,968 | 6/1983 | Sekiguchi . | |
| 4,445,757 | 5/1984 | Enomoto et al. . | |
| 4,910,544 | 3/1990 | Nomura . | |
| 4,914,461 | 4/1990 | Hori . | |
| 5,051,764 | 9/1991 | Nomura . | |
| 5,052,781 | 10/1991 | Iizuka | 359/823 |
| 5,164,757 | 11/1992 | Nomura . | |

FOREIGN PATENT DOCUMENTS

| 670162 | 9/1963 | Canada | 74/89.15 |
|---|---|---|---|
| 0344806 | 12/1989 | European Pat. Off. . | |
| 62-127513 | 8/1987 | Japan . | |
| 2-10514 | 1/1990 | Japan . | |
| 3-123309 | 5/1991 | Japan | 359/704 |
| 3-42412 | 9/1991 | Japan . | |
| 3-209445 | 9/1991 | Japan | 359/701 |
| 2229016 | 9/1990 | United Kingdom . | |
| 2237406 | 5/1991 | United Kingdom | 359/704 |

*Primary Examiner*—David W. Laub
*Attorney, Agent, or Firm*—Sandler, Greenblum & Bernstein

[57] ABSTRACT

A rotary feed mechanism including gears provided on an outer peripheral surface of an inner ring, male threads on an outer peripheral surface of an inner ring, and an outer ring having female threads which engage with the male threads of the inner ring. At least one male thread formed between the gears of the inner ring is engaged with a female thread provided on the outer ring, and at least one pinion engages with at least one of the gears, regardless of the axial position of the inner ring with respect to the outer ring. When the at least one pinion is rotated, the rotation is transmitted to the inner ring, and the inner ring is moved in an optical axis direction, with respect to the outer ring, in accordance with the engagement between the male and female threads.

23 Claims, 10 Drawing Sheets

ROTARY FEED MECHANISM

BACKGROUND OF THE INVENTION

1. Field of the Invention

The present invention relates to a rotary feed mechanism which rotates and feeds one of a pair of annular members, wherein the annular members engage with each other through a multiple thread (helicoid), through a gear arrangement.

2. Description of Related Art

For instance, in a known lens barrel of a camera, a movable (inner) ring which is screw-engaged by a stationary (outer) ring, through a multiple thread (helicoid), is moved (fed) in an optical axis direction when the movable ring is rotated with respect to the stationary ring. In particular, in a known zoom compact camera, the movable ring is provided, on the outer peripheral surface thereof, with a gear which is in mesh with a pinion driven by a motor to drive the movable ring.

In such a known rotary feed mechanism, it is necessary to provide both the multiple thread and the gear on the outer peripheral surface of the movable ring. To shorten the axial length of the movable ring, it is known to cut away a part of the multiple thread, so that the gear can be provided in the cut-away portion in such a way that the gear is inclined in the same direction as that of the multiple thread. Namely, the provision of the gear in the cut-away portion of the multiple thread makes it possible to shorten the axial length of the movable ring as a whole, in comparison with an arrangement in which the gear and the multiple thread are located at different axial positions.

To increase the axial displacement (feed) of the movable ring, it is necessary to increase the number of gear teeth or lengthen the pinion and widen the gear so that the pinion and gear engagement has an increased axial length. To increase the number of gear teeth, however, leads to an increase in the axial length of the movable ring since the gear extends along the multiple thread in a direction inclined with respect to the axis of the movable ring. On the other hand, if the gear width is increased, the circumferential area of the movable ring in which the multiple thread can be formed is accordingly decreased, resulting in an insufficient degree of engagement with the stationary ring. This may cause the movable ring to be askew with respect to the stationary ring.

In order to increase a zoom ratio of a zoom lens in a camera which is to be made as compact as possible, it is necessary to provide a sufficient amount of feed of the movable ring without making the latter askew with respect to the stationary ring. No conventional feed mechanism satisfactorily accomplishes this requirement.

SUMMARY OF THE INVENTION

The primary object of the present invention is to provide a rotary feeding mechanism in which the amount of feed (displacement) of a movable ring (inner ring) can be increased without making the same askew with respect to a stationary ring (outer ring) with which the movable ring engages.

Another object of the present invention is to provide a small (i.e, small diameter) rotary feed mechanism.

According to an aspect of the present invention, there is provided a rotary feed mechanism comprising gears and male threads provided on an outer peripheral surface of an inner ring and an outer ring having female threads which engage with the male threads of the inner ring, wherein the gears provided on the outer peripheral surface of the inner ring, are inclined in the same direction as the multiple male threads with respect to the axis of the inner ring, and wherein at least one male thread formed between the gears of the inner ring engages with a female thread provided on the outer ring, and at least one pinion which engages with at least one of the gears to rotate the inner ring relative to the outer ring, regardless of the axial position of the inner ring.

With this arrangement, a sufficient amount of feed of the inner ring can be obtained by engagement of the pinion and at least one of the gears. Furthermore, since thread portions are provided between the gears, the inner ring is prevented from being inclined or disengaged.

Preferably, the circle defined by the tip of the gears about the inner ring has a diameter greater than that of the male thread provided between the gears, thereby preventing the pinion from interfering with the male thread. This makes it possible to dispose the pinion close to the gears, owing to the smaller diameter of the thread portion between the gears than that of the remaining thread portions of the multiple threads, thus allowing for a miniaturization of the whole arrangement. Furthermore, the inner ring is prevented from being disengaged or becoming askew with respect to the outer ring.

According to an aspect of the present invention, the pinion includes a shaft portion and a plurality of narrow pinion elements which are spaced from one another on the shaft portion, and which are successively engaged by the gears.

According to another aspect of the present invention, an improvement is addressed to the pinion rather than the gears provided on the inner ring.

Namely, a rotary feed mechanism comprises a plurality of pinions along the axial direction of gears of the inner ring, and spaced in a manner such that at least one of the pinions always engages with the gears, regardless of the axial position of the inner ring.

Preferably, a drive mechanism is provided to rotate the pinions at the same speed and in the same direction.

With this arrangement, the gears are successively engaged by the pinions when the inner ring is axially fed. Since the pinions are rotated in the same direction at the same speed, a sufficient amount of feed of the inner ring can be achieved. Since it is not necessary to widen the gears, the inner ring is prevented from becoming askew due to the engagement of the multiple threads.

BRIEF DESCRIPTION OF THE DRAWINGS

The invention will be described below in detail with reference to the accompanying drawings, in which.

DESCRIPTION OF THE PREFERRED EMBODIMENT

Below, a detailed explanation will be given for the present invention, based on embodiments shown in the attached figures.

Figure 3:
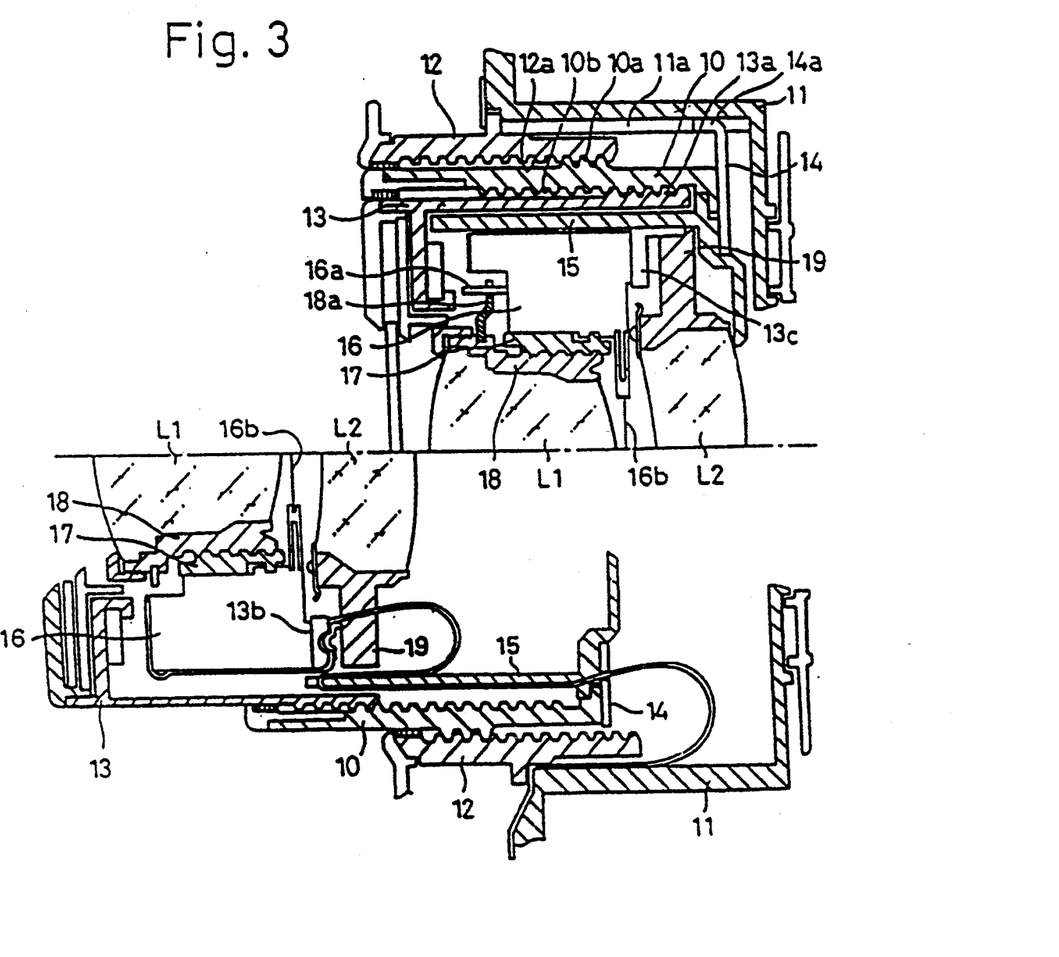
FIG. 3 is a sectional view of a zoom lens barrel to which a rotary feed mechanism, according to the present invention, can be applied, by way of example.
Figure 4:
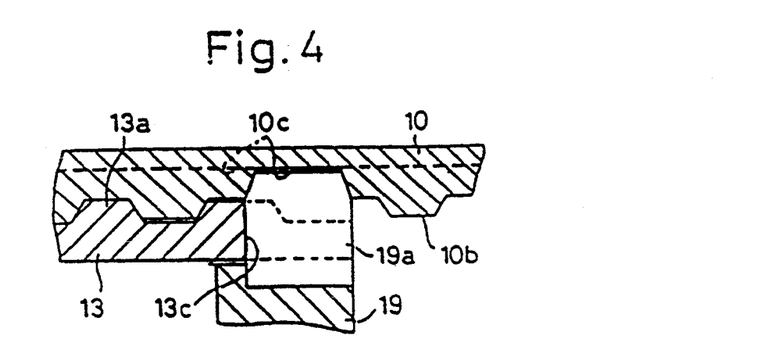
FIG. 4 is a sectional view of a main part of a zoom lens barrel shown in FIG. 3.
Figure 5:
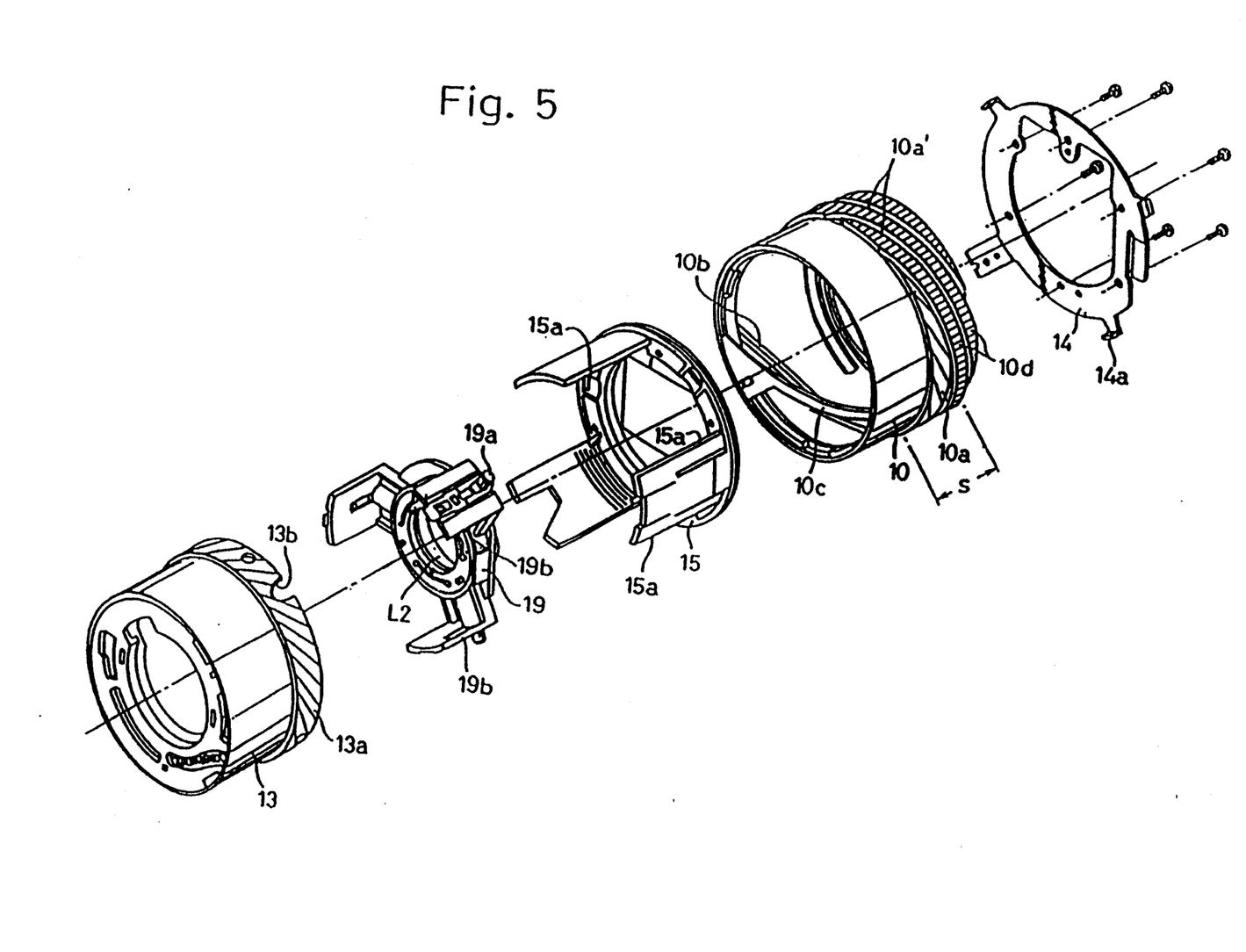
FIG. 5 is an exploded perspective view of a main part of a zoom lens barrel shown in FIG. 3.

FIGS. 3 through 5 show a zoom lens barrel having a rotary feed mechanism according to the present invention.

A stationary barrel 11, integral with a camera body, has a helicoid ring (outer ring) 12 secured thereto, which has a multiple female thread 12a in mesh with a multiple male thread 10a formed on an outer peripheral surface of a cam ring (inner ring) 10. The cam ring 10 is provided on the inner peripheral surface thereof with a multiple female thread 10b and an inner cam groove 10c. The multiple female thread 10b is screw-engaged by a multiple male thread 13a of a front lens barrel (helicoid body) 13. A linear movement guide plate 14 is located at the rear end of the cam ring 10 and has radial projections 14a which are fitted in linear movement guide grooves 11a formed on the stationary lens barrel 11. A linear movement guide ring 15 is secured to the linear movement guide plate 14, so that the cam ring 10 is rotatable with respect to the linear movement guide ring 15.

The front lens barrel 13 has a shutter holding frame 13b secured thereto to which a rear end of an annular shutter unit 16 is secured. The shutter unit 16 is provided on the inner peripheral surface thereof with a helicoid ring 17 which is screw-engaged by a front lens frame 18 holding a front lens group L1. The shutter unit 16 has a drive pin 16a which is engaged by a drive pin 18a integrally formed on the front lens frame 18. As is well known, the drive pin 16a is rotated by an angular displacement corresponding to an object distance measured by an object distance measuring meter (not shown) of the camera. The rotation of the drive pin 16a is transmitted to the front lens frame 18 through the driven pin 18a, so that the front lens frame 18 (front lens group L1) is rotated and moved in the optical axis direction to effect the focusing operation. The shutter unit 16 opens and closes shutter blades 16b in accordance with the brightness signal of an object to be taken, as detected by a photometer (not shown).

A rear lens frame 19, which holds a rear lens group L2, is provided with a radially projecting cam pin 19a which is fitted in the cam groove 10c provided on the inner peripheral surface of the cam ring 10. The rear lens frame 19 and the shutter holding frame 13b are guided by the linear movement guide surface formed on the linear guide ring 15. In FIG. 5, the guide surfaces 19b of the rear lens frame 19 are located between the linear movement guide surface 15a of the linear guide ring 15.

The cam pin 19a of the rear lens frame 19 is fitted in a recess 13b formed on the rear end face of a front lens cylinder 13 in an assembly. Consequently, when the multiple male thread 13a, formed on the outer peripheral surface of the front lens cylinder 13, is engaged by the multiple female thread 10b of the cam ring 10, the cam pin 19a can be simultaneously fitted in the inner cam groove 10c.

After assembly, the rotation of the cam ring 10 causes the front and rear lens cylinders 13 and 19 to independently move in the optical axis direction in accordance with the multiple threads 10b and 13a and the cam groove 10c, respectively. Namely, in the zoom lens barrel as constructed above, when the cam ring 10 is rotated, the cam ring 10 is itself moved in the optical axis direction in accordance with the multiple male and female threads 10a and 12a. At the same time, the front lens cylinder 13 (front lens group L1) is linearly moved in the optical axis direction in accordance with the multiple male and female threads 10b and 13a, and is guided by the linear movement guide ring 15.

Furthermore, when the cam ring 10 is rotated, the rear lens frame 19 (rear lens group L2) is moved in the optical axis direction in accordance with the cam groove 10c of the cam ring 10 and the cam pin 19a of the rear lens frame 19, and is linearly guided by the linear guide ring 15 to effect the zooming operation.

The subject of the present invention is primarily directed to the engaging mechanism of the helicoid ring (outer ring) 12 and the cam ring (inner ring) 10, for example, in a zoom lens barrel as constructed above, and the rotation drive mechanism of the cam ring 10.

Figure 1:
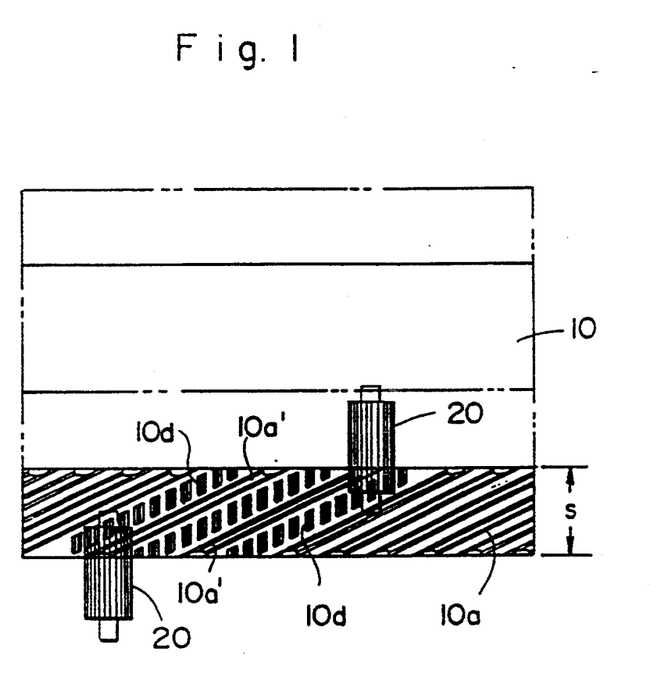
FIG. 1 is a developed view of an inner ring (cam ring) of a rotary feed mechanism, according to a first embodiment of the present invention.

The rear portion of cam ring 10 is provided with the multiple male thread 10a and a plurality of (e.g., three) parallel gears 10d, as shown in FIG. 1. Each of the gears 10d is made of a spur gear having teeth parallel to the axis of the cam ring 10 and inclined in the same direction as the thread 10a. There is one thread 10a existing between the adjacent gears 10d. In other words, the multiple male thread 10a is partly cut away in the circumferential direction thereof, and the gears 10d are provided in the cut-away portion. In the illustrated embodiment, three thread portions are removed (cut away) on alternate thread lines, and the three alternate gears 10d are located in the cut-away portion. The multiple male thread 10a, each thread portion 10a', and the gears 10d have identical axial lengths "s" (FIG. 1).

Figure 2:
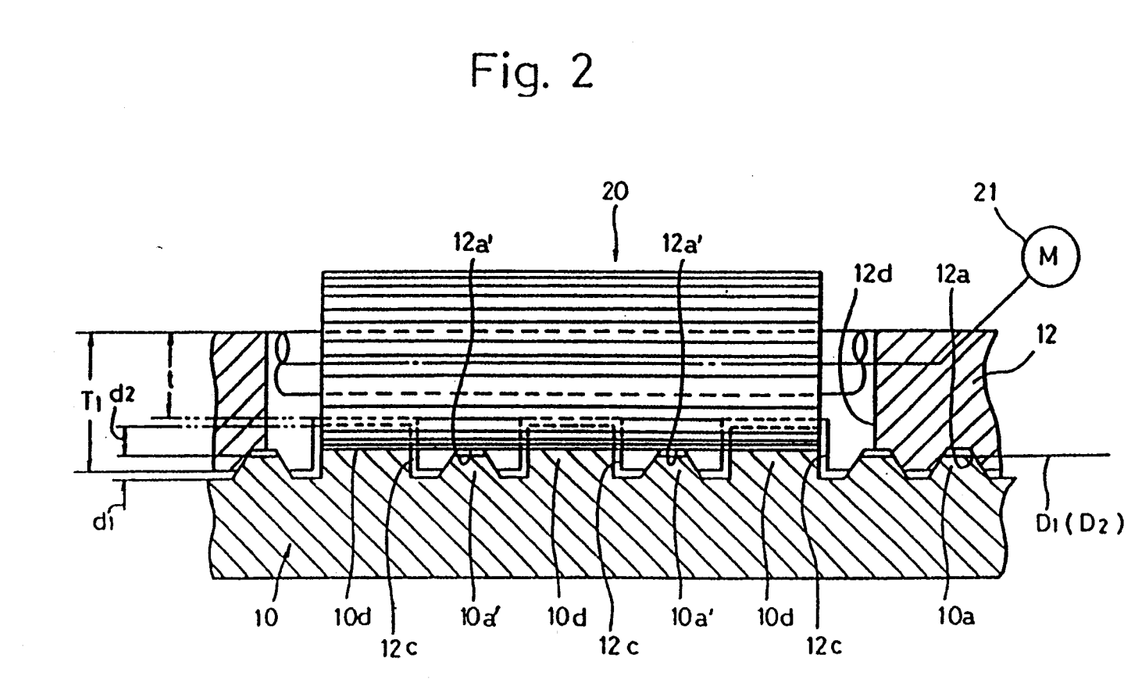
FIG. 2 is a sectional view of an inner ring meshed with an outer ring, according to the present invention.

The helicoid ring 12 is provided on the inner peripheral surface thereof with the multiple female thread 12a and three recesses 12c corresponding to the multiple male thread 10a and the three gears 10d of the cam ring 10, as shown in FIG. 2. Namely, three female thread portions (grooves) are removed on alternate thread lines of the female thread 12a, and the three alternate recesses 12c are located in the cut-away portion, so that two alternate female thread portions 12a′, between the recesses 12c and the three recesses 12c, correspond to the two male thread portions 10a′ and the three gears 10d, respectively. Consequently, the male thread portions 10a′ are screw-engaged by the female thread portions 12a′, so that when the cam ring 10 is rotated in accordance with the engagement between the multiple male thread 10a and the multiple female thread 12a, and between the male thread portions 10a′ and the female thread portions 12a′, the gears 10d are moved in the associated recesses 12c without coming into contact with the walls of the recesses 12c.

The helicoid ring 12 has a cut-away portion 12d in which the pinion 20 is located to engage the gears 10d. The pinion 20 has an axial length sufficiently long so as to simultaneously engage with all three gears 20. At the frontmost and rearmost extremities of the cam ring 10 displacement, the pinion 20 engages with only the rearmost and frontmost gears 10d, respectively. The pinion 20 is rotatably held by an immovable portion (not shown) to be located at an initial position in the cutaway portion 12d and is rotated by a motor 21.

Note that there are two pinions 20 shown at different positions in FIG. 1, for clarification of the engaging relationship between the pinion 20 and the gears 10d at the frontmost and rearmost extremities of the displacement of the cam ring 10. In an actual arrangement, however, only one pinion 20 is provided. The pinion 20 does not move in the optical axis direction, but rather the cam ring 10 does.

In the illustrated embodiment, the thickness "$T_1$" of the helicoid 12 is given by the following equation;

$$T_1 = d_1 + d_2 + t$$

wherein "$d_1$" designates the height of the thread (i.e., the distance from the bottom to the top of the thread), "$d_2$" the distance between the top of the thread 10a and the top of the teeth of the gear 10d, and "$t$" the thickness of the bottom of the recesses 12c. It is assumed that the gaps between the cam ring 10 and the helicoid ring 12, between the top of the teeth of the gears 10d and the recesses 12c, and between the threads 10a and 12a are all identical, and the height "$d_2$" is identical to the full depth of the teeth of the pinion 20, respectively. The clearance between the threads and the bottoms of the mating threads and the clearance between the teeth of the gears are also constant in all the embodiments mentioned above and discussed below In FIG. 1, "$D_1$" designates the largest diameter of the multiple male thread 10a (i.e., the height of the top of the thread from the axis of the cam ring 10).

When the pinion 20 is rotated by the motor 21, the rotation is transmitted to the cam ring 10 through the gears 10d. As a result, the cam ring 10 is moved in the optical axis direction while rotating, in accordance with the engagement between the multiple male thread 10a (male thread portions 10a′) and the multiple female thread 12a (female thread portion 12a′) to effect the zooming operation.

During the axial feeding operation (axial movement) of the cam ring 10, the pinion 20 always comes into contact with at least one of the three gears 10d and the engagement of the thread portions 10a′ and 12a′ (multiple threads 10a and 12a) are always maintained. Consequently, the cam ring 10 does not become askew, with respect to the helicoid 12 due to disengagement therebetween.

The application of the present invention is not limited to a zoom lens barrel, as shown in FIGS. 3, through 5. The rotary feed mechanism of the present invention can be applied to other zoom lens barrels, or similar equipment or apparatuses, etc.

Figure 13:
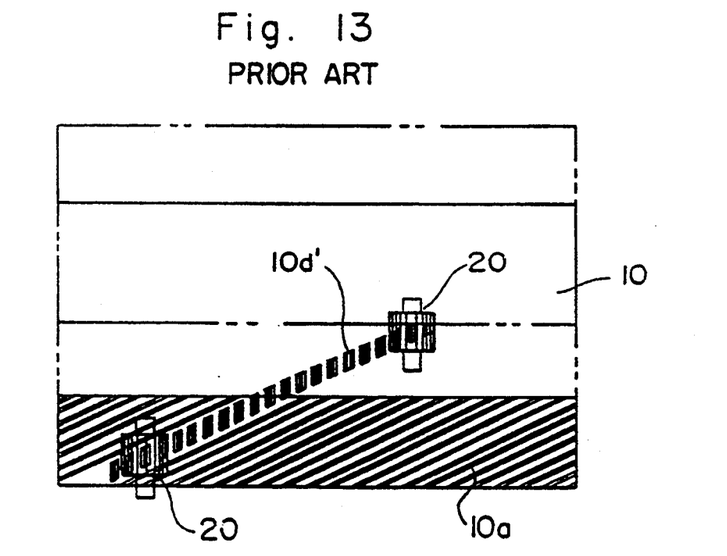
FIG. 13 is a comparative example, showing a developed view of a known ring; and, FIG. 14 is an additional comparative example, showing a developed view of a known inner ring similar to FIG. 1.
Figure 14:
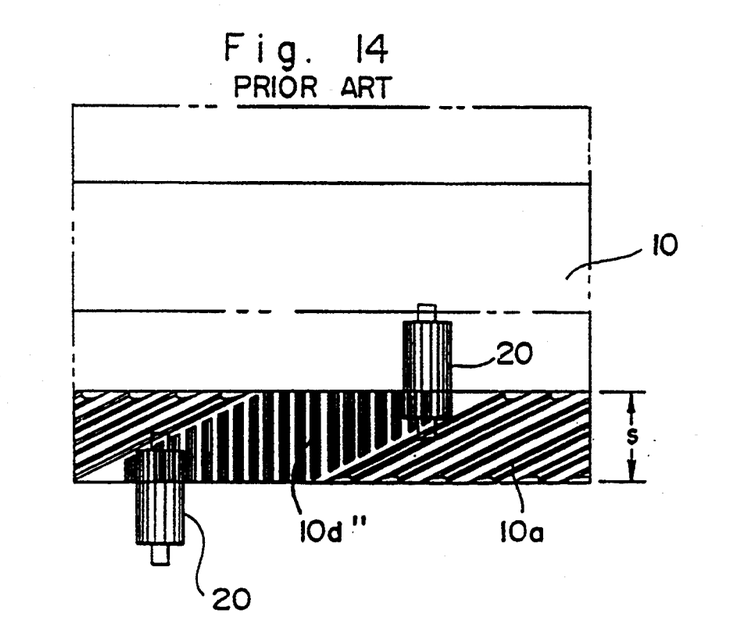

FIGS. 13 and 14 show two comparative examples to obtain the same amount of feed (displacement) of the cam ring 10 as the present invention without the provision of the three gears 10d. In FIG. 13, there is only one gear 10d′ having the same width as each gear 10d in the present invention, and in FIG. 14, there is only one wide gear 10d″ having the same axial length "s" as that of the gears 10d in the present invention.

In the first comparative example, shown in FIG. 13, to obtain the same amount of feed (displacement) of the cam ring 10 as the present invention, it is necessary to increase the axial length of the gear 10d′. Accordingly, the axial length of the cam ring 10 becomes longer than the that of the cam ring 10 in the present invention.

In the second comparative example, shown in FIG. 14, to obtain the same amount of feed (displacement) of the cam ring 10 as the present invention, it is necessary to reduce the circumferential length of the multiple male thread 10a, Accordingly, the cam ring 10 tends to be askew with respect to the helicoid ring 12.

Figure 6:
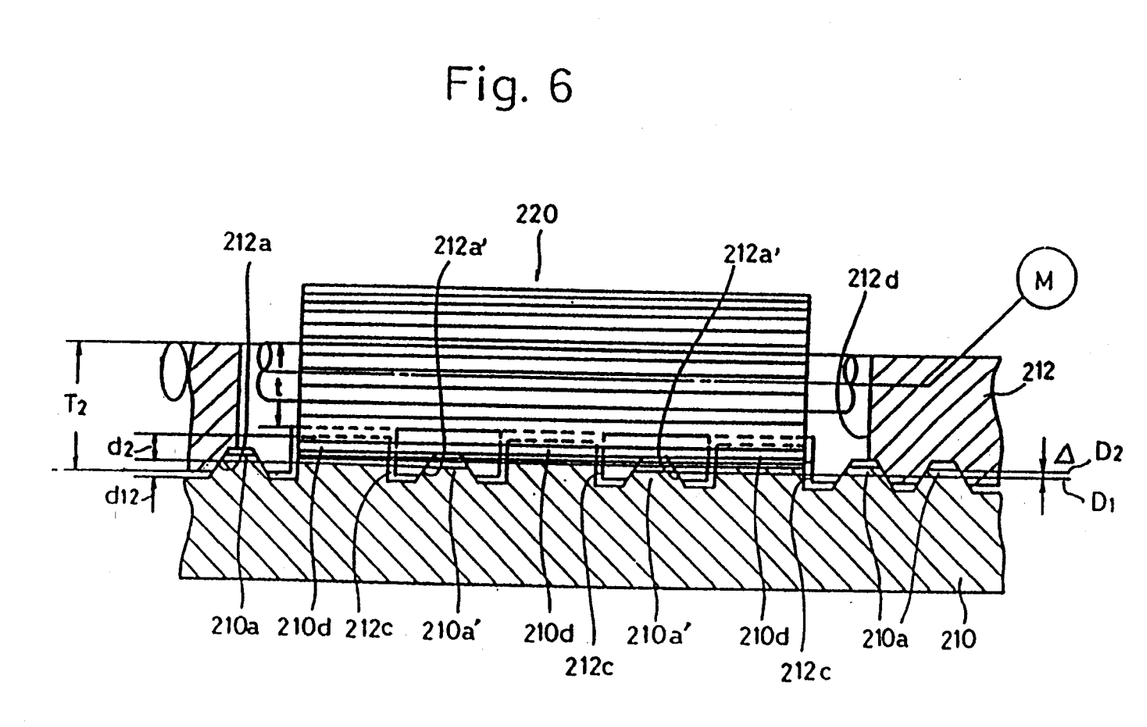
FIG. 6 is a sectional view of an inner ring in mesh with an outer ring, according to a second embodiment of the present invention.

FIG. 6 Shows a second embodiment of the present invention, in which the largest diameter "$D_1$" of the thread portions 210a′ between the three gears 210d is smaller than the largest diameter "$D_2$" of the multiple thread 210a. The difference between $D_1$ and $D_2$ is represented by $\Delta$ in FIG. 6 ($D_2 - D_1 = \Delta$). Accordingly, the height of the thread 210d is smaller than that in the first embodiment, shown in FIG. 2, by a value corresponding to $\Delta$. Consequently, the pinion 220 can be closer to the cam ring 210 by an amount $\Delta$ than the arrangement in the first embodiment. Accordingly, the whole diameter, including the pinion 220 can be reduced.

Furthermore, if the largest diameter of the helicoid ring 212 is determined by the thickness "$t$" thereof at the recesses 212c, the depth of the recesses 212c is reduced by $\Delta$ and the diameter of the helicoid ring 212 is reduced by $\Delta$, in comparison with the first embodiment in which $D_1$ is identical to $D_2$. The thickness $T_2$ of the helicoid ring 212 is defined by:

$$\begin{aligned} T_2 &= t + d_{12} + d_2 - \Delta \\ &= T_1 - \Delta \end{aligned}$$

wherein "$d_{12}$" designates the height of the thread 210a, and "$d_2$" the height of the gears 210d from the cylindrical surface defined by the top of the thread 210a.

Consequently, the largest diameter of the helicoid ring 212 can be smaller by an amount $\Delta$ than the helicoid ring 12 of the first embodiment.

The value $\Delta$ is, for example, about 1 mm. This, incidentally, is a negligibly small value for a typical lens barrel, but is not negligible for a compact zoom lens which must be as small as possible. For instance, in such a compact zoom lens, it is possible to accommodate a thin element, such as a flexible printed circuit board (sheet) in a space of 1 mm.

Figure 7:
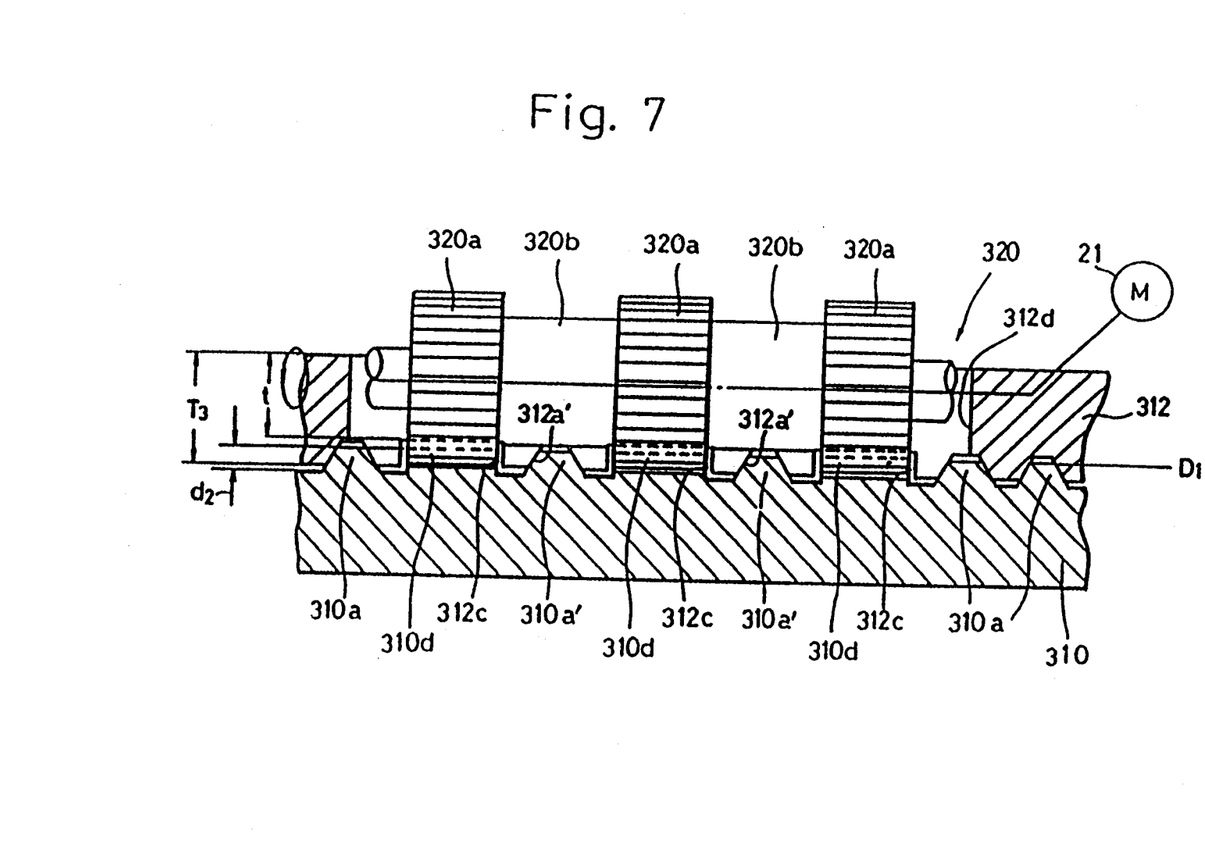
FIG. 7 is a sectional view of an inner ring in mesh with an outer ring, according to a third embodiment of the present invention.
Figure 8:
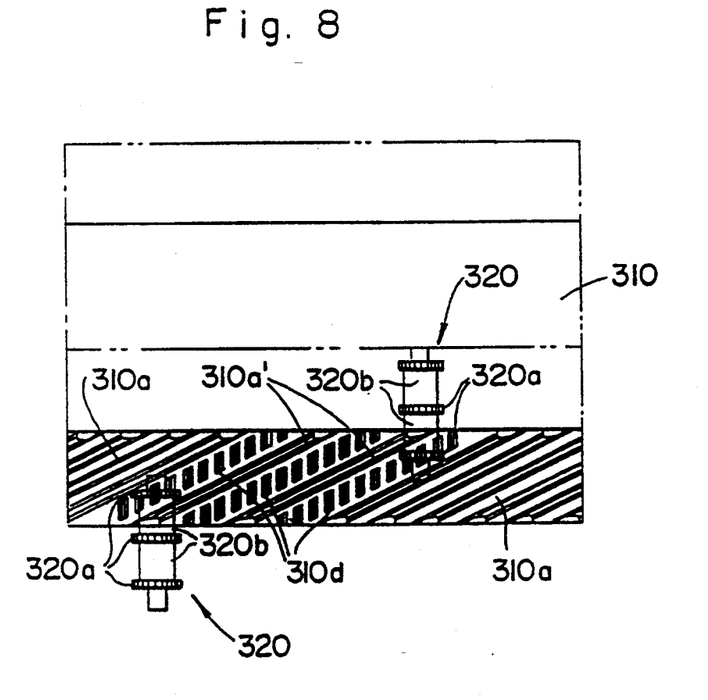
FIG. 8 is a developed view of an inner ring (cam ring) shown in FIG. 7, according to a third embodiment of the present invention.

FIGS. 7 and 8 show a third embodiment of the present invention. The pinion 320 in the third embodiment includes three pinion elements 320a of small width which can be engaged by the three respective gears 310 depending on the axial position (displacement) of the cam ring 310. The pinion 320 further includes small diameter portions 320b provided between the pinion elements 320a. The small diameter portions 320b, are smaller than the diameter of the pinion elements 320a and correspond to the thread portions 310a'.

Between the thread portions 310a' are provided gears 310d having teeth extending parallel to the axis of the cam ring along the thread portions 310a'. The small diameter portions 320b provided between the pinion elements 320a do not interfere with the multiple male thread 310a (thread portions 310a'). Consequently, since there is no interference between the pinion 320 and the thread portions 310a', the height of the gears 310d can be determined, taking into account only the engagement with the pinion elements 320a.

Accordingly, in the third embodiment, the height of the gears 310a from the surface of the cam ring 310 is set to be identical to the height $d_2$ of the pinion elements 320a. The reduced height of the height of the gears 310a makes it possible to dispose the pinion 320 closer to the cam ring 310, resulting in a miniaturization of the whole arrangement.

The thickness "$T_3$" of the helicoid ring 312 is equal to a sum of the thickness "t" and the height "$d_2$" ($T_3=t+d_2$). Consequently, the radius (diameter) of the helicoid ring 312 can be smaller than the thickness "$T_1$" of the helicoid ring 12 by the value "$d_1$" and than the thickness "$T_2$" of the helicoid ring 212 by the value ($d_1-\Delta$), respectively.

The pinion 320 is disposed close to the cam ring 310, so that the pinion elements 320a can be engaged by the associated gears 310d. The pinion 320 is rotatably supported in the cut-away portion 312d and is rotated by the motor 21, similar to the pinion 20 in the first embodiment.

During the rotation and feeding operation of the cam ring 310 in the axial direction, since the three pinion elements 320a always engage with at least one of the three gears 310d and the engagement of the thread portions 310a' and 312a' (threads 310a and 312a) is retained, the cam ring 310 is prevented from becoming askew with respect to the helicoid ring 312.

FIGS. 9 through 12 show a fourth embodiment of the present invention, in which the amount of displacement (feed) of the cam ring (inner ring) can be increased by a single gear (i.e., without using a plurality of gears) and in which the cam ring is prevented from becoming askew.

In the fourth embodiment illustrated in FIGS. 9 through 12, the cam ring 410 is provided on the rear end thereof with a multiple male thread 410a and a single gear 410d whose teeth are made of a spur gear parallel to the axis of the cam ring 410, and are inclined in the same direction as the multiple male thread 410a. In other words, the multiple male thread 410a is partly cut away, and the gear 410d is provided in the cut-away portion. The axial length "s" of the multiple male thread 410a is identical to that of the gear 410d.

Figure 12:
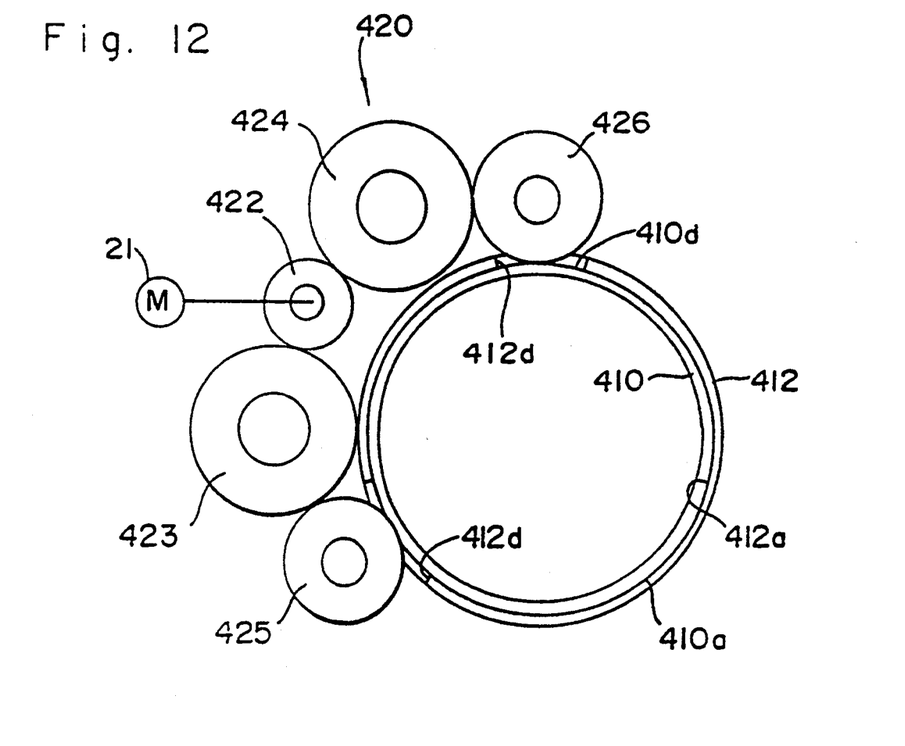
FIG. 12 is a front elevational view of a gear mechanism, according to a fourth embodiment of the present invention shown in FIG. 9.

A rotating mechanism 420 is provided outside of the helicoid ring 412 to rotate a pair of pinions. The rotating mechanism 420 includes a drive gear 422 which is rotated in the forward and reverse directions, a pair of idle gears 423 and 424, which are in mesh with the drive gear 422, and a pair of pinions 425 and 426, which are in mesh with the respective idle gears 423 and 424. The pinions 425 and 426 are engaged by the gear 410d. The idle gears 423 and 424, and the pinions 425 and 426, have the same number of teeth, so that the pinions 425 and 426 are rotated in the same direction at the same speed.

Figure 9:
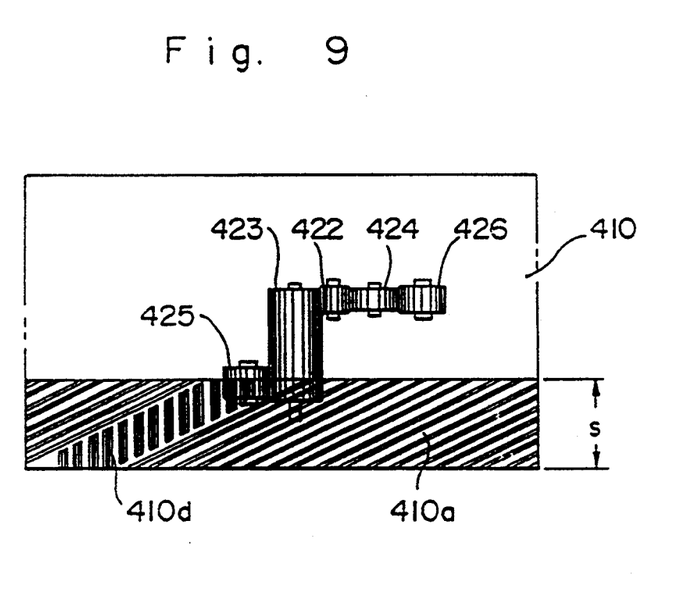
FIG. 9 is a developed view of an inner ring in a retracted position thereof, according to a fourth embodiment of the present invention.
Figure 10:
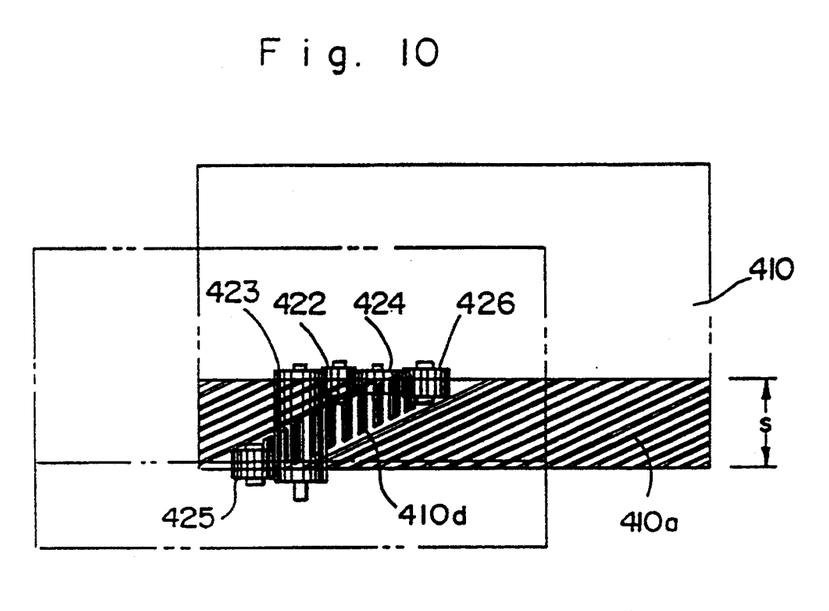
FIG. 10 is a developed view of an inner ring in an intermediate position thereof, according to a fourth embodiment of the present invention.
Figure 11:
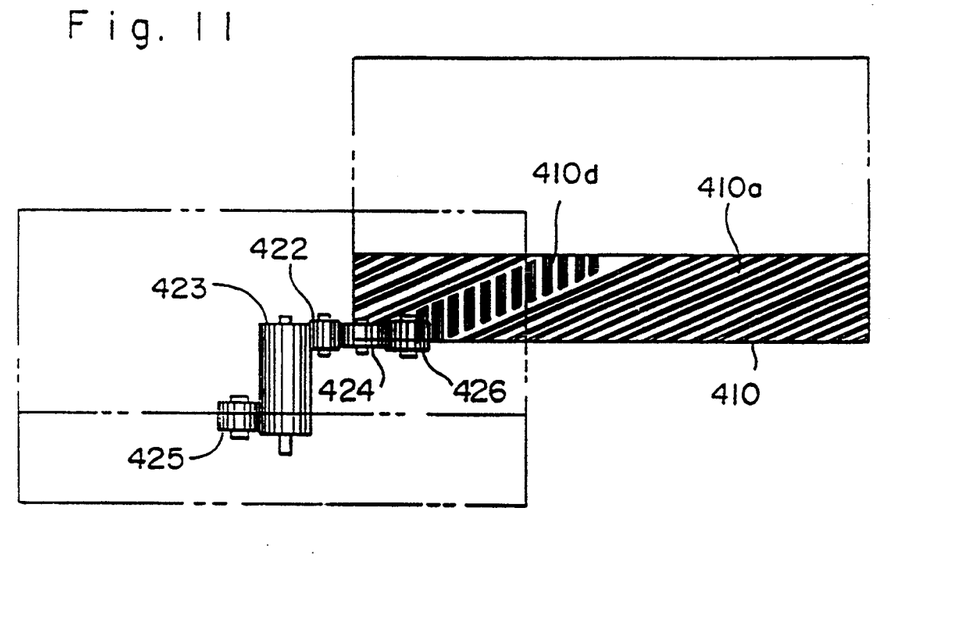
FIG. 11 is a developed view of an inner ring in an advanced position thereof, according to a fourth embodiment of the present invention.

The pinions 425 and 426 are spaced from one another in the inclination direction of the gear 410d, as can be seen in FIGS. 9, 10 and 11. At least one of the pinions 425 and 426 always engages with the gear 410d, regardless of the axial position (feed) of the cam ring 410. The pinions 425 and 426 engage with the gear 410d, for example, through the cut-away portions (openings) 412d formed in the helicoid ring 412.

In the rotary feeding mechanism, as constructed above, when the drive gear 422 is rotated by the motor 21, the pinions 425 and 426 are rotated at the same speed in the same direction through the idle gears 423 and 424. In the illustrated fourth embodiment, when the cam ring 410 is located at the rear end position (retracted position), one of the pinions 425 and 426, i.e., the pinion 425, is in mesh with the gear 410d (FIG. 9). In this state, when the cam ring 410 is moved while rotating by the rotation of the pinion 425 in a predetermined direction and in accordance with the engagement of the threads 412a and 410a, both the pinions 425 and 426 engage with the gear 410d (FIG. 10). A further advancement of the cam ring 410 while rotating causes the pinion 425 to disengage from the gear 410d and only the pinion 426 and engages with the gear 410d (FIG. 11). Conversely, if the motor 21 is reversed, the cam ring 410 is retracted in the opposite direction while rotating. Consequently, a sufficient amount of feed (displacement) of the cam ring 410 can be obtained without increasing the width of the gear 410d to carry out the zooming operation at a high zoom ratio.

Although the multiple male thread is provided on the outer peripheral surface of the cam ring, and the multiple female thread is provided on the inner peripheral surface of the helicoid ring in the illustrated embodiments, it is possible to provide the multiple male thread and the multiple female thread on the helicoid ring and the cam ring, respectively. Alternatively, it is possible to provide the multiple male threads on both the helicoid ring and the cam ring.

As can be seen from the above discussion, according to the first and third embodiments of the present invention, the displacement of the inner ring, which is driven through a gear or gears provided on the outer peripheral surface thereof and engaged by an outer ring through a multiple thread, can be increased without making the inner ring askew with respect to the outer ring.

Furthermore, according to the present invention, since the diameter of the thread portions provided between the gears is smaller than the diameter of the remaining thread portions, the pinion can be located closer to the gears, resulting in a decrease in the diameter of the assembly as a whole.

According to the fourth embodiment of the present invention, since a plurality of pinions are provided to engage with the gear provided on the outer surface of the inner ring, the displacement of the inner ring can be increased without increasing the width of the gear or the number of the gears. Furthermore, since the multiple thread has a sufficient effective thread length, the inner ring is prevented from becoming askew.

We claim:
1. A rotary feed mechanism comprising:
an inner ring having an outer peripheral surface;
gears provided on said outer peripheral surface of said inner ring;

male threads on said outer peripheral surface of said inner ring;

an outer ring having female threads which engage with said male threads of said inner ring;

said gears being inclined in the same direction as a multiple male thread with respect to the axis of said inner ring; and wherein at least one male thread formed between the gears of said inner ring is engaged with a female thread provided on said outer ring, and at least one pinion engages with at least one of said gears to rotate said inner ring relative to said outer ring, regardless of the axial position of said inner ring, and wherein said inner ring is moved in an optical axis direction, in accordance with the engagement between said male threads and said female threads.

2. A rotary feed mechanism according to claim 1, wherein a circle defined by the tops of said gears has a diameter larger than the diameter of said male thread provided between said gears.

3. A rotary feed mechanism according to claim 1, wherein said outer ring comprises an inner peripheral surface, said inner peripheral surface having recesses through which said gears pass.

4. A rotary feed mechanism according to claim 3, wherein said recesses are provided therein with female threads engaged with said male thread of said inner ring.

5. A rotary feed mechanism according to claim 1, wherein said outer ring is provided with a cut-away portion through which said at least one pinion engages with said gears.

6. A rotary feed mechanism according to claim 1, further comprising a motor for driving said at least one pinion.

7. A rotary feed mechanism according to claim 1, wherein the outer diameter of said male thread provided between said gears is smaller than that of the multiple male thread.

8. A rotary feed mechanism according to claim 7, wherein a circle defined by the tops of said gears has a diameter larger than the diameter of said male thread provided between said gears.

9. A rotary feed mechanism according to claim 8, wherein the number of said gears is such that at least one of said gears always engages with said at least one pinion, regardless of the axial position of said inner ring.

10. A rotary feed mechanism according to claim 1, wherein said at least one pinion comprises a shaft portion and a plurality of narrow pinion elements which are spaced from one another on said shaft portion and which are successively engaged by said gears.

11. A rotary feed mechanism according to claim 9, wherein a circle defined by the tops of said gears has a diameter substantially equal to or smaller than the diameter of said male thread provided between said gears.

12. A rotary feed mechanism according to claim 9, wherein the outer diameter of the male thread provided between the gears is the same as the multiple male thread.

13. A rotary feed mechanism comprising:
an inner ring having an outer peripheral surface;
gears provided on said outer peripheral surface of said inner ring;
male threads on said outer peripheral surface of said inner ring;
an outer ring having female threads which engage with said male threads of said inner ring;
said gears being inclined in the same direction as a multiple male thread with respect to the axis of said inner ring; and wherein at least one male thread formed between the gears of said inner ring is engaged with a female thread provided on said outer ring, and at least one pinion engages with at least one of said gears to rotate said inner ring relative to said outer ring, regardless of the axial position of said inner ring, and wherein said inner ring is moved in an optical axis direction, in accordance with the engagement between said male threads and said female threads; and said outer ring being provided on the inner peripheral surface thereof with recesses through which said gears pass.

14. A rotary feed mechanism according to claim 13, wherein a circle defined by the tops of said gears has a diameter larger than the diameter of said male thread provided between said gears.

15. A rotary feed mechanism according to claim 13, wherein an outer diameter of said male thread provided between said gears is larger than that of said multiple male thread.

16. A rotary feed mechanism comprising:
an inner ring having an outer peripheral surface;
gears provided on said outer peripheral surface of said inner ring;
male threads on said outer peripheral surface of said inner ring;
an outer ring having female threads which engage with said male threads of said inner ring;
said gears being inclined in the same direction as a multiple male thread with respect to the axis of said inner ring;

wherein at least one male thread formed between said gears of said inner ring is engaged with a female thread provided on said outer ring, and at least one pinion engages with at least one of said gears to rotate said inner ring relative to said outer ring, regardless of the axial position of said inner ring, and wherein said inner ring is moved in an optical axis direction, in accordance with the engagement between said male threads and said female threads;

said outer ring being provided on the inner peripheral surface thereof with recesses through which said gears pass; and wherein said at least one pinion comprises a shaft portion and a plurality of narrow pinion elements which are spaced from one another on said shaft portion and which are successively engaged by said gears.

17. A rotary feed mechanism comprising:
an inner ring having an outer peripheral surface;
gears provided on said outer peripheral surface of said inner ring;
male threads on said outer peripheral surface of said inner ring;
an outer ring having female threads which engage with said male threads of said inner ring;
a plurality of pinions aligned in the direction of inclination of said gears provided on the outer peripheral surface of said inner ring;
wherein at least one of said pinions always engages with said gears, regardless of the axial position of said inner ring;

further wherein said gears being inclined in the same direction as a multiple male thread with respect to the axis of said inner ring;

wherein at least one male thread formed between said gears of said inner ring is engaged with a female thread provided on said outer ring, and at least one of said pinions engages with at least one of said gears to rotate said inner ring relative to said outer ring, regardless of the axial position of said inner ring, and wherein said inner ring is moved in an optical axis direction, in accordance with the engagement between said male threads and said female threads;

said outer ring being provided on the inner peripheral surface thereof with recesses through which said gears pass.

18. A rotary feed mechanism according to claim 17, wherein an outer diameter of said male thread provided between said gears is larger than that of said multiple male thread.

19. A rotary feed mechanism according to claim 17, wherein a circle defined by the tops of said gears has a diameter larger than the diameter of said male thread provided between said gears.

20. A rotary feed mechanism comprising:
an inner ring having an outer peripheral surface;
a gear provided on said outer peripheral surface of said inner ring;
male threads on said outer peripheral surface of said inner ring;
an outer ring having female threads which engage with said male threads of said inner ring;
said gear being inclined in the same direction as said male threads with respect to the axis of said inner ring;
a plurality of pinions aligned in the direction of inclination of said gear provided on the outer peripheral surface of said inner ring, wherein at least one of said plurality of pinions always engages with said gear regardless of the axial position of said inner ring; and
a gear train through which said plurality of pinions are driven by a motor.

21. A rotary feed mechanism according to claim 20, wherein said gear train further comprises two pairs of gear trains which are rotated at the same speed by the motor, and wherein said plurality of pinions are rotated at the same speed and in the same direction.

22. A rotary feed mechanism according to claim 20, wherein at least two of said plurality of pinions are aligned in different positions along the direction of inclination of said gear.

23. A rotary feed mechanism according to claim 20, wherein said plurality of pinions are spaced from one another along the direction of inclination of said gear.

* * * * *